(12) United States Patent
Harel

(10) Patent No.: US 6,655,101 B2
(45) Date of Patent: Dec. 2, 2003

(54) DRYWALL FINISHING TRIM HAVING FIBER COVERING FABRICATED WITH STRENGTHENING COMPOUND

(75) Inventor: Kenneth N. Harel, Anaheim, CA (US)

(73) Assignee: Continuous Coating Corporation, Orange, CA (US)

( * ) Notice: Subject to any disclaimer, the term of this patent is extended or adjusted under 35 U.S.C. 154(b) by 0 days.

(21) Appl. No.: 09/825,766

(22) Filed: Apr. 3, 2001

(65) Prior Publication Data
US 2002/0142136 A1 Oct. 3, 2002

(51) Int. Cl.⁷ .................................................. E04B 2/00
(52) U.S. Cl. .................. 52/287.1; 52/309.15; 52/741.3; 162/169
(58) Field of Search ............................ 52/515, 309.15, 52/287.1, 717.04, 716.1, 716.5, 364, 376, 366, 741.3; 428/464; 162/169

(56) References Cited

U.S. PATENT DOCUMENTS

| | | | |
|---|---|---|---|
| 2,234,701 A | 3/1941 | Lyman | |
| 2,590,846 A | 4/1952 | Cutting | |
| 2,593,859 A | 4/1952 | Dunlap | |
| 2,851,741 A | 9/1958 | Stemples | |
| 2,862,264 A | 12/1958 | Perna | |
| 2,904,856 A | 9/1959 | Robinson | |
| 3,090,087 A | 5/1963 | Miller | |
| 3,109,207 A | 11/1963 | Cooper | |
| 4,624,087 A | 11/1986 | Schneller | |
| 4,722,153 A | 2/1988 | Hardy | |
| 4,863,774 A | 9/1989 | Tucker | |
| 4,876,837 A | 10/1989 | Kelly et al. | |
| 4,977,718 A | 12/1990 | Hoffman | |
| 5,037,686 A | 8/1991 | Conboy | |
| 5,048,247 A | 9/1991 | Weldy | |
| 5,058,354 A | 10/1991 | Menchetti | |
| 5,131,198 A * | 7/1992 | Ritchie et al. | 52/287 |
| 5,238,720 A | 8/1993 | Volkman | |
| 5,313,755 A | 5/1994 | Koenig | |
| 5,314,584 A | 5/1994 | Grinnell et al. | |
| 5,328,567 A | 7/1994 | Kinsley | |
| 5,390,458 A | 2/1995 | Menchetti | |
| 5,466,336 A | 11/1995 | Kinsley | |
| 5,498,314 A | 3/1996 | Kinsley | |
| 5,613,335 A * | 3/1997 | Rennich et al. | 52/255 |
| 5,800,675 A | 9/1998 | Kinsley | |
| 5,824,191 A | 10/1998 | Kinsley | |
| 5,836,122 A | 11/1998 | Rennich et al. | |

FOREIGN PATENT DOCUMENTS

| | | |
|---|---|---|
| AU | 646843 | 3/1994 |
| AU | 55424/98 | 2/1998 |
| AU | 59758/98 | 2/1998 |
| AU | 695482 | 8/1998 |
| CA | 487518 | 10/1952 |
| CA | 553665 | 3/1958 |
| CA | 2237349 | 11/1998 |

OTHER PUBLICATIONS

Pages from CSM Bluenose catalog on Paper/Metal Drywall Trims.
Pages from Beadex catalog entitled Built For All The Corners Of The World on Commercial & Residential Drywall Trims.

* cited by examiner

Primary Examiner—Carl D. Friedman
Assistant Examiner—Naoko Slack
(74) Attorney, Agent, or Firm—Fulwider Patton Lee & Utecht, LLP

(57) ABSTRACT

A drywall trim device incorporating a metal core covered on the exterior by a cover strip fabricated from fibers mixed with a strengthening compound to encapsulate the fibers. The method of the invention may involve mixing the strengthening compound with the fibers in a beating process, putting the fiber in a film or layer and drying the film or layer before bonding to the metal core by a bond.

24 Claims, 4 Drawing Sheets

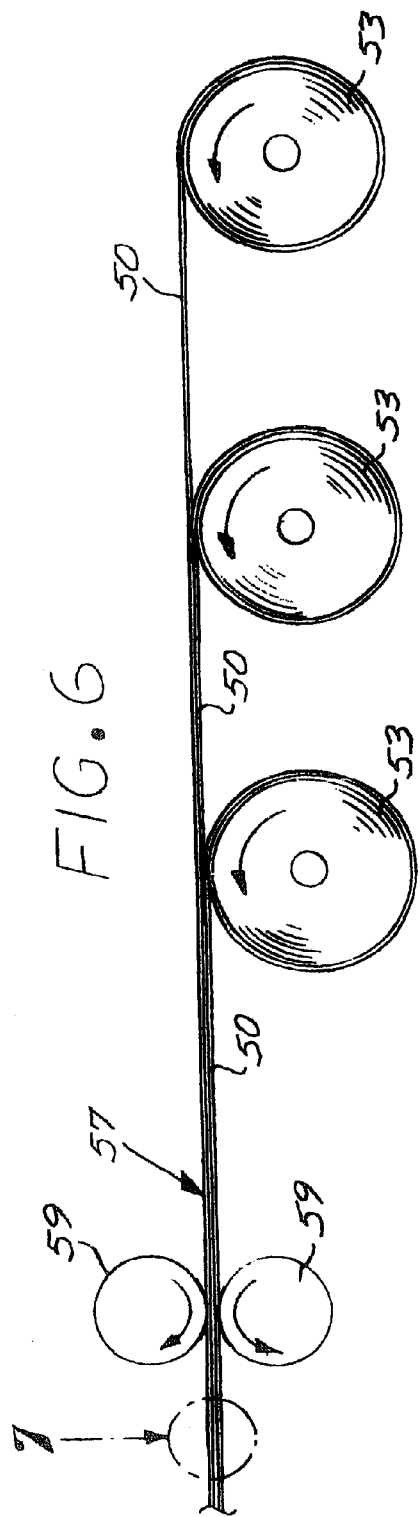
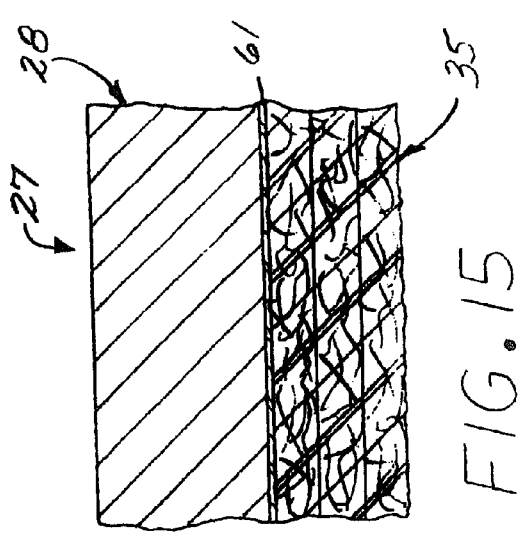
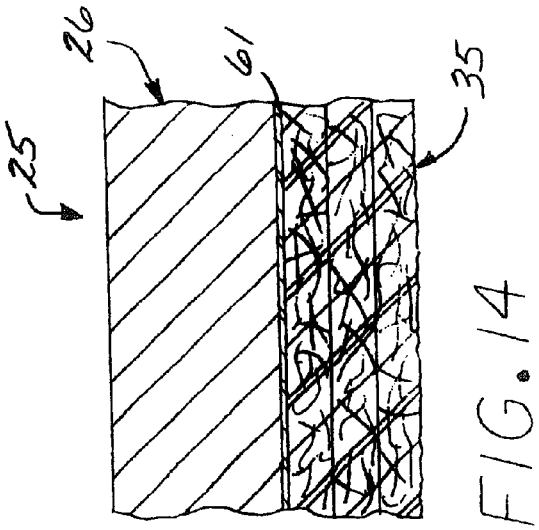

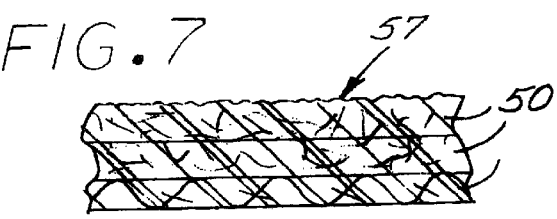
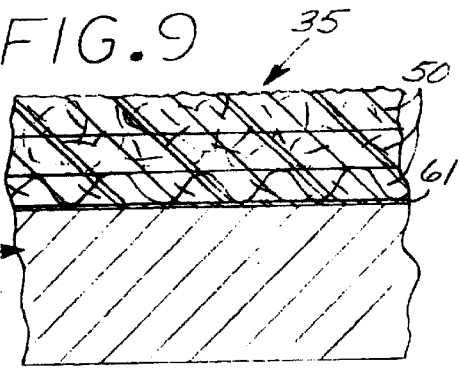
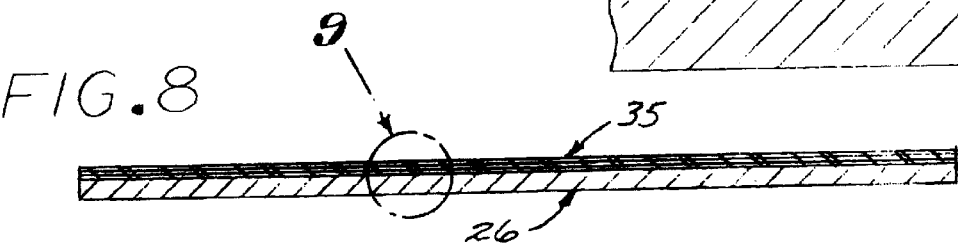
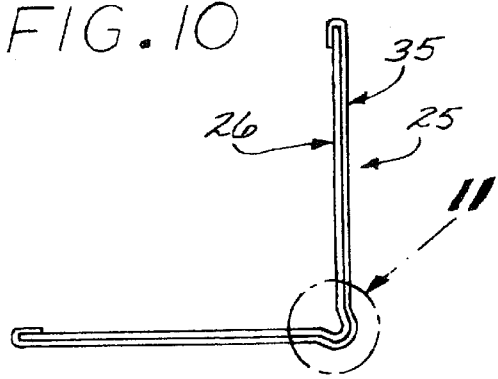
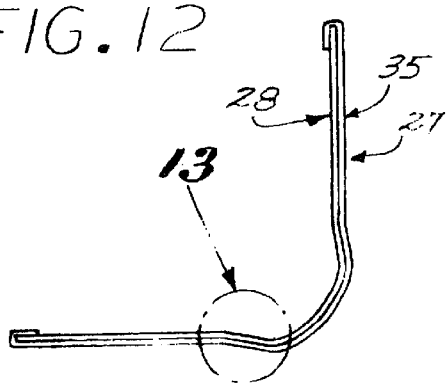
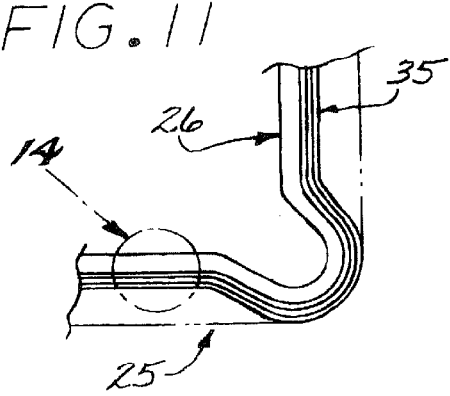
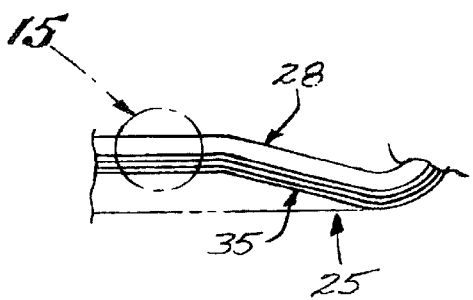

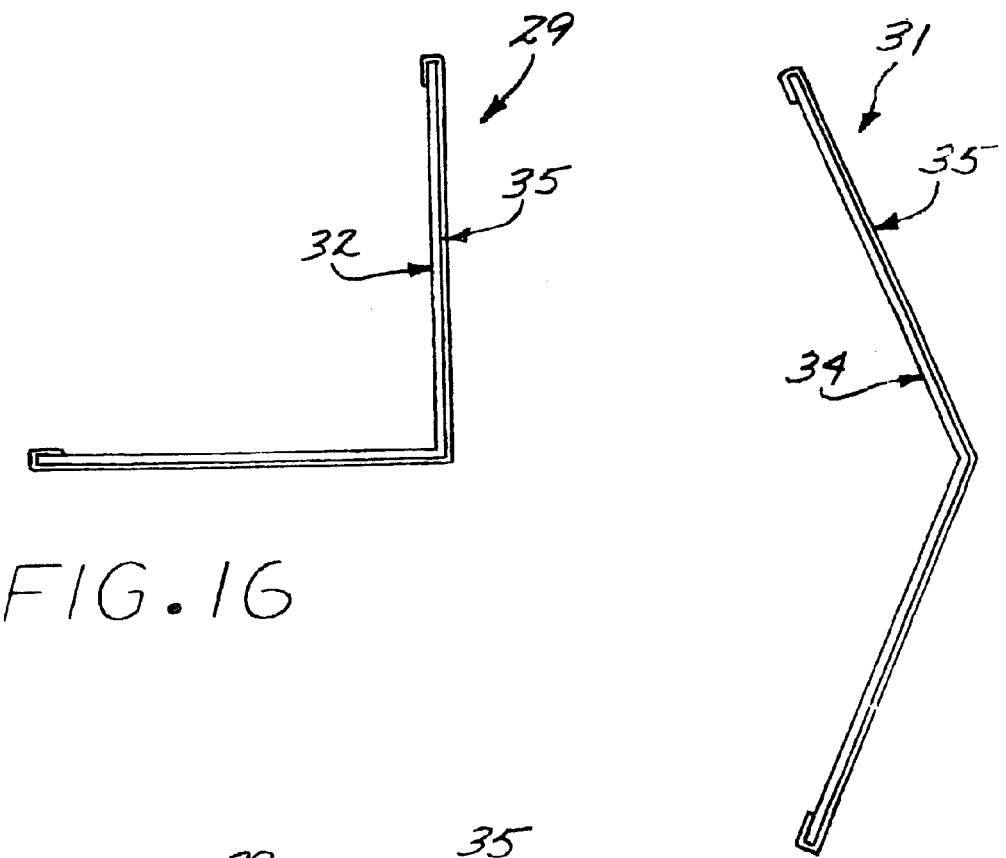
FIG. 16
FIG. 17
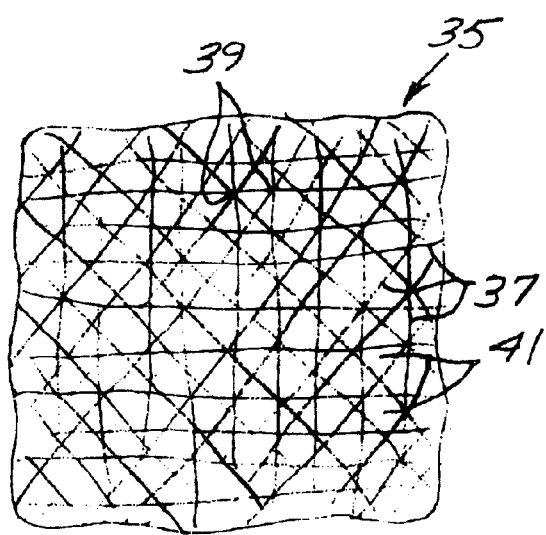
FIG. 18

DRYWALL FINISHING TRIM HAVING FIBER COVERING FABRICATED WITH STRENGTHENING COMPOUND

BACKGROUND OF THE INVENTION

1. Field of the Invention

The present invention relates to drywall finish trim devices typically utilized in finishing a drywall installation at a corner or terminus.

2. Description of the Prior Art

Drywall, sometimes also referred to as wallboard, is a staple in the construction industry as an economical alternative to plaster for forming the interior walls and ceilings of rooms in residential, commercial, and industrial buildings. The materials used in drywall construction include gypsum board, plywood, fibre-and-pulp boards, and asbestos-cement boards. The large, rigid sheets are fastened directly to the frame of a building with nails, screws, or adhesives, or are mounted on furring (strips of wood nailed over the studs, joists, rafters, or masonry, which allow free circulation of air behind the interior wall). A significant advantage afforded by drywall construction is that it allows a builder to avoid delays because the interior walls do not have to dry before other work can be started or to obtain specific finishes. Wallboard is manufactured in both finished and unfinished forms, and finished wallboards may be faced with vinyl or other materials in a variety of permanent colors and textures so that they do not need to be painted when installed.

When employing drywall in construction, builders can easily cut the panels to any desired shape and size. However, workmen face a challenge in finishing drywall panels at an edge or corner. It is very difficult, if not impossible, to cut the edges of such panels with the precision, straightness, and smoothness that is required to abut the edges of adjoining panels to form a straight corner that will afford an aesthetic finish. Additionally, cutting of the drywall panels exposes the soft, raw cores thereof, thus requiring some sort of covering to afford a finished appearance.

As a result, to protect the drywall panel edges and enhance their aesthetic appearance, several devices and techniques may be employed in an effort to produce a structurally sound corner that will exhibit a smooth and seamless intersection. Devices proposed to achieve this result include drywall tape, trim and corner beads. When conventional drywall tape is used, it is applied to the joints and edges of abutting panels and is covered with wet joint compound that is feathered and smoothed to cover the newly created seams. When the joint compound has dried, the tape and drywall can be sanded, painted, covered, or otherwise finished in whatever manner is desired. A great deal of skill is required, however, to apply and form the joint compound to create a sufficiently straight intersection that will exhibit, when taped and sanded to a finish, no evidence of scuffing and tearing in the tape.

In light of the limitations of drywall tape, trim strips or corner beads are often utilized in effort to produce a seamless and aesthetically pleasing edge trim or intersection at the corners of drywall panels.

Such trim may take many different forms and are typically in the form of an angle corner bead having diverging flanges or may be, for instance, a J strip to cap the edge of a dry wall panel. For the purposes of this invention, the particular configuration is not critical but use in conjunction with numerous different configurations is contemplated. For instance, the trim may be flat or configured with any one of a number of well known configurations, including corner trim with perpendicular flanges, corner trim with a rib formed at the juncture of the flanges defining a bead, flanges angled at 135° to one another, those configured with somewhat of a Z shape, those with soft line corners, and those with offsets or other configurations traditionally used in the trade and known to those skilled in the art.

To enhance the finished appearance of finished drywall made with such trim, efforts have been made to provide such trim with an exterior covering of paper or paper-like material to facilitate a finishing strip. It is recognized that by covering a metal core with paper, the paper surface may be covered during the finishing process with a joint compound which is then sanded off and feathered in effort to provide a smooth and continuous surface.

A disadvantage arising from the use of such paper covered trim cores is that, during the sanding process, the workman might sand through such compound and sand into the paper layer. This sanding tends to scuff up the fiber in the paper layer leaving somewhat of a scuffed or abraded surface, oftentimes with frayed fiber ends. This results in a discontinuous and unattractive surface. When finished, as by paint or the like, a somewhat fuzzy and porous appearance may result with the exposed fibers and fiber ends presenting an aesthetically unpleasing finish.

Efforts to solve this problem have led to the development of various different trims and corner beads. One such corner bead available in the market is a corner flange having a hard core covered on the exterior with kraft paper, which is then coated with latex. This product has proven somewhat unsatisfactory in the marketplace. First, the latex coating is oftentimes without uniformity in thickness and is often ineffective to provide protection against penetration and fraying by the roughened surface of a finish tool, such as sandpaper. Frequently, the workman will in certain areas sand through the latex coating, thus raising the fibers from the underlying paper and resulting in a dissatisfactory final appearance. A corner bead of this type is shown in U.S. Pat. No. 5,131,198 to Ritchie.

In recognition of the shortcomings of such surface coated paper covering the core of drywall trim, other efforts have been made to provide a more acceptable paper coating for trim core. Corner beads have been proposed that are constructed of a core covered by a wood fiber kraft paper impregnated with latex. Efforts have been made to impregnate such stock paper to a uniform thickness. A device of this type is shown in U.S. Pat. No. 5,613,335 to Rennich. While suitable for its specifically intended purpose, such a bead suffers a shortcoming in that efforts to penetrate paper stock with latex have proven relatively ineffective to provide satisfactory scuff resistant characteristics throughout the thickness of the paper covering.

Other shortcomings of prior drywall trims covered with paper or paper-like covering become evident when they are subjected to high temperatures above about 100° F., as during the storage in storage sheds or in transportation thereof. In such instances, the paper covering will often bubble up on the core or will pull away from the core, particularly in the area of any irregularity in the core surface as in the case of any shoulder or rib formed in such core. This bubbling and separation of the paper covering is often detected only at the construction site after the product has been transported and stored for preparation of the drywall phase of the construction project. Consequently, the onsite workman thus oftentimes reject and discard any strips of such deteriorated trim thus resulting in significant waste.

Consequently, there exists a need for a drywall trim which will resist scuffing. It would also be beneficial if such a trim would resist separation of the cover from the core of the trim to thus minimize waste while enhancing the ultimate aesthetics of the finished product.

SUMMARY OF THE INVENTION

The drywall trim device of the present invention is characterized by a metal core covered on at least a portion of the exterior side by a cover bonded thereto. The cover is fabricated by mixing a mixture of fiber with a strengthening compound to cover the fibers with such strengthening compound, and forming the mixture into a strip to form the cover.

The strengthening compound preferably fills in the interstices formed between the network of fibers to thus cooperate with the encapsulation of the fibers to minimize any shrinkage of the covering material relative to the core as a result of high temperatures which might cause dehydration.

The trim may be manufactured by fabricating a metal core which can be formed to any desired configuration as dictated by the end use thereof. Strengthening compounds, such as latex, may be mixed with the fiber material in a beater mixing process typically utilized in the manufacture of paper used for book covers and the like. The fiber and latex mix may be formed in a thin film and multiple films combined together to form a covering strip. The individual films or combined layers thereof may be pressed to the desired thickness and to enhance the smoothness of the surface.

In at least one embodiment, the strengthening compound is mixed with fibers in the manufacturing process and the fibrous film and strengthening compound film constructed such that the interstices between the various fibers is filled with the compound to act as a filler in such interstices.

Other objects and features of the invention will become apparent from consideration of the following description taken in conjunction with the accompanying drawings.

BRIEF DESCRIPTION OF THE DRAWINGS

FIG. 6 is a diagrammatic view of paper layers fed from three rollers to be combined and bonded into a covering strip;

FIG. 7 is a cross sectional view in enlarged scale taken from the circle designated 7 in FIG. 6;

FIG. 8 is a transverse cross sectional view in enlarged scale of a core covered by the covering strip shown in FIG. 6;

FIG. 9 is a cross sectional view in enlarged scale taken from the circle designated 9 in FIG. 8 depicting the three layered covering strip adhered to the core element;

FIG. 10 is an end view of a hard-line corner bead made in accordance with the present invention, and with the thickness of the core and covering strip being exaggerated for the purposes of illustration;

FIG. 11 is an detailed sectional view in enlarged scale taken from the circle designated 11 in FIG. 10.

FIG. 12 is a side view of a soft-line corner bead made in accordance with the present invention, and with the thickness of the elements being exaggerated for the purposes of illustration;

FIG. 13 is an enlarged detailed sectional view taken from the circle designated 13 in FIG. 12.

FIG. 14 is a cross sectional view taken from the circle designated 14 in FIG. 11, depicting the three layered covering strip adhered to the core element;

FIG. 15 is a cross sectional view taken from the circle designated 15 in FIG. 13, depicting the three layered covering strip adhered to the core element;

FIG. 16 is an end view of a third embodiment of the drywall trim device of the present invention;

FIG. 17 is an end view of a fourth embodiment of the drywall trim device of the present invention; and FIG. 18 is a diagrammatic view depicting fiber segments and strengthening compound incorporated in a protective cover on the drywall trim device of the present invention.

DETAILED DESCRIPTION OF THE PREFERRED EMBODIMENTS

Figure 1:
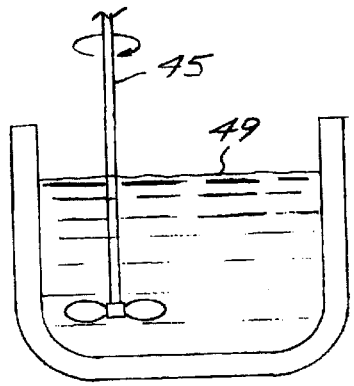
FIG. 1 is a diagrammatic view of the fibers of the pulp being mixed with water to make a cover strip used in the drywall finish trim device of the present invention.

As shown in the drawings and for purposes of illustration, the present invention provides for an improved drywall trim having a cover that is resistant to scuffing and abrasion. In some embodiments, such cover is also resistant to separation from the core at elevated temperatures or after prolonged use.

The core may be formed in many different shapes, such as with orthogonal flanges for a perpendicular corner, a J shape for edge capping, a 135° splay to accommodate obtuse corners or any other shape now in existence or which may be developed in the future for facilitating the finish of drywall construction.

Referring to FIGS. 10–17, the drywall finish device of the present invention may take the form of a corner finish angle, sometimes referred to in the trade as a corner bead. Examples of such corner beads are the hard line and soft corner beads 25 and 27, shown in FIGS. 10 and 11 respectively, and the conventional corner bead 29 shown in FIG. 16. As noted above, other trim shapes are well known to those skilled in the art and are contemplated to be within the scope of this invention.

The respective trim devices 25, 27, 29 and 31 of the present invention are all covered on at least one flange with a cover, generally designated 35, fabricated by mixing fibers 37 (FIG. 18) with a strengthening compound 39 to encapsulate such fibers 37 with the compound. In the preferred embodiment, the encapsulating and strengthening compound 39 is in the form of a latex. The latex is intermixed in such quantities and configurations so as to fill the interstices 41 formed between the various fibers 37.

The covering strip 35 is generally manufactured from a pulp consisting of cellulose or synthetic fibers, water, and other additives. These additives may enhance such characteristics of the material as its strength, water resistance, resistance to abrasions and weathering, and its internal fiber bonding, which are particularly desirable when using the material to form covering strips for various beads used in drywall construction.

For example, to address the problems of scuffing and damage to conventional paper strips used to cover metal or plastic cores in paper beads, recent developments in the art have incorporated more durable and resilient paper or other fiber based coverings to protect the paper bead core. There are many manufacturing and treatment methods for making such covering strips more durable and resilient. Modern paper manufacturing techniques generally use the cellulose fibers in wood pulp in combination with pulps from waste paper or, for finer grades of paper, with fibers from cotton rags or virgin, chemically pulped fiber. Chemical pulp that is made by boiling a mixture of wood chips with either soda, sulfite, or sulfate, may also be used in the process.

I have discovered that a hard finish, commercially available paper, typically utilized in book covering will provide high resistance to scuffing and abrasion and, when adhered properly, will provide a reliable drywall trim. Such product is available under the trade designation 88 Pound Bristol Flex From FiberMark of Fitchburg, Mass. Presently, this type of paper is manufactured by a beater process where a strengthening compound, such as latex, is added to the mix. It is understood, for the purpose of my invention, I intend to include any type of covering which is made by mixing fiber segments with any form of strengthening material available to add resistance to abrasion and scuffing, including fiber and strengthening materials now in existence or which might become available in the future.

Figure 2:
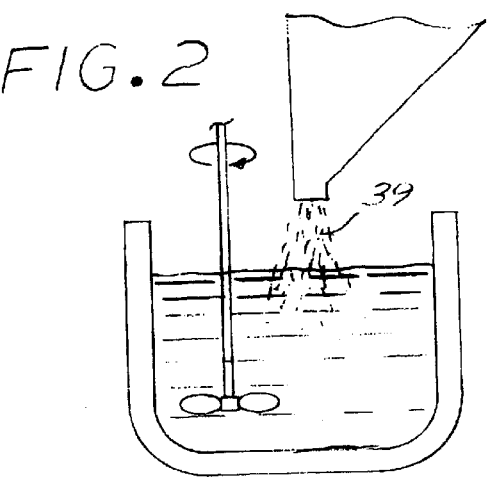
FIG. 2 is a diagrammatic view of a latex being added to the pulp mixture to encapsulate the individual cellulose fibers.

During such manufacturing process, a beater 45 (FIGS. 1 and 2) may be used to split and mash the fibers 37. This mechanical squeezing and pounding of the fibers permits water to penetrate their structure, causing swelling of the fibers and making them more flexible. When the pulp 49 and water are combined by the beater 45, the beaten fibers are also cut smaller, and bond together more readily as the water is removed or drained away, thus producing a more dense paper of higher tensile strength and lower porosity. As an alternative to beaters, a continuous refiner known as a pulper may be used to separate the pulp fibers. Blades in the pulper transform the pulp or wastepaper into a smooth liquid or paste mixture by emphasizing fiber brushing rather than cutting. It is believed that by premixing the fiber and latex, the body of the fibers are compacted somewhat in the process and the latex serves to encapsulate the bodies of such fibers to cause them to exhibit less of a frayed or straggly configuration. This then results in the fibers being less susceptible to the absorption of water or expansion and contraction under variations in water content.

The pulp may then be poured onto a wire screen, conveyors, or a fabric web, where the water is drained away and the fibers form a thin mat by bonding to one another. In the next step of the manufacturing process, the matted fibers forming the paper are passed through a series of rollers to dry, press, and smooth the paper. It is believed that this process may serve to press the fiber bodies into an even more compacted state and to compress the size of the interstices to create a structure which is resistant to water absorption and the consequent expansion or contraction with the subsequent removal of water in a high temperature environment. The paper may then be sized by treating it with a variety of substances to further prevent aqueous solutions from soaking into it and to add strength and stiffness to the paper. To transform the rolled paper into a final, usable state, it must be finished or converted. During conversion, the paper may be coated, impregnated, or laminated with various applied materials to improve its properties for special purposes. The final overall strength of the paper is determined by the following factors in combination: (1) the strength of the individual fibers of the stock; (2) the average length of the fiber; (3) the inter-fiber bonding ability of the fibers, which is enhanced by the beating and refining action described above; and (4) the structure and formation of the sheet to include materials added to the forming paper during manufacturing or surface treatments applied after the paper is formed.

For the present invention, it is also important to note that, because paper or other fibrous materials formed by the above described process are composed of randomly matted layers of fiber, the structure has a varying degree of porosity. Thus, the ability of fluids, both liquid and gas, to penetrate the structure is a property that is highly significant depending on the intended application of the paper, and is capable of being adapted to the intended application by varying the conditions of manufacture. For example, the porosity of a covering strip may be reduced by beating an easily hydrated pulp to extremely fine sizes to produce a relatively dense sheet with very little void space. In the alternative, the resistance of the covering strip to the penetration of water can be increased by treatment of the fiber with materials that lack affinity for water, with little effect on the sheet porosity. This can be achieved during the processing of the pulp or by treating or sizing the paper after it is formed into sheets. For example, the covering strip may be treated with a coating material comprising a fine particle size, acrylic, water-based synthetic resin emulsion that may be applied with a brush, roller, or sprayer. When the coating dries, the surface of the covering strip will be coated with a protective acrylic film layer.

In effort to develop paper beads with a paper covering strip of increased durability and resistance to scuffing and other abrasive damage, prior work has focused on post manufacturing techniques, i.e. coating or impregnating stock paper or a synthetic fiber product with latex or another strengthening compound. Various commercial cross-linked latex lattices have been proposed in an attempt to penetrate the stock paper fiber layers. This impregnation has been proposed to increase the paper's strength and reduce its resistance to scuffing and abrasion throughout its thickness. However, impregnation or other post-manufacturing surface treatment methods may not be available to a large segment of the industry, and may be cost prohibitive, or they may be inadequate to improve the strength and durability of the paper sufficiently to provide adequate resistance to scuffing and water absorption. While impregnation may aspire to uniformly penetrate the fiber layers, post-manufacturing treatments may not adequately impregnate all layers throughout, and may leave the internal or lower layers susceptible to weathering, abrasion, or scuffing. Additionally, when the bead covered by the paper is exposed to high temperatures or dry conditions during storage or use, the paper may dehydrate, shrink and form ruptures in its fibre layers or bubble up and begin to separate from the core, thereby defeating the benefits afforded by paper beads.

In effort to develop a corner bead with a suitable covering strip capable of uniformly resisting abrasion and scuffing throughout its thickness that would also reliably adhere to a metallic core without rupturing or bubbling up at elevated temperatures and after exposure to weathering, I discovered that a commercially available fibrous material was suitable for the present invention. Such a material is commonly used for book covers and is pressed during the manufacturing process to a thickness of about 0.008 inches thick, though many other thicknesses will suffice as it is only important that the cover be sufficiently thick to afford the desired finish benefits.

Figure 3:
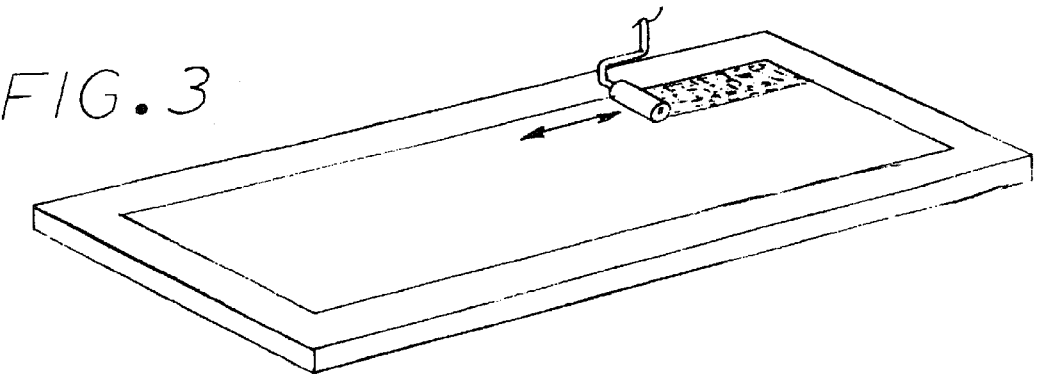
FIG. 3 is a perspective view depicting the pulp mixture being deposited on a fabric web for drying.
Figure 4:
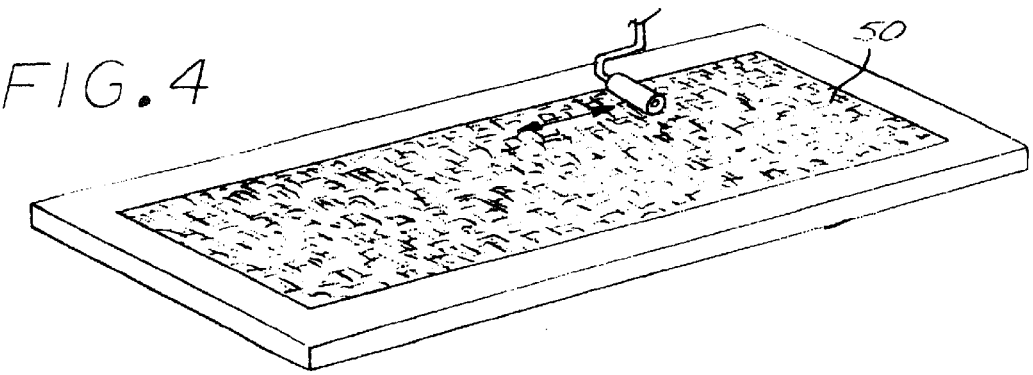
FIG. 4 is a perspective view of a fibrous layer as it dries on the fabric web.
Figure 5:
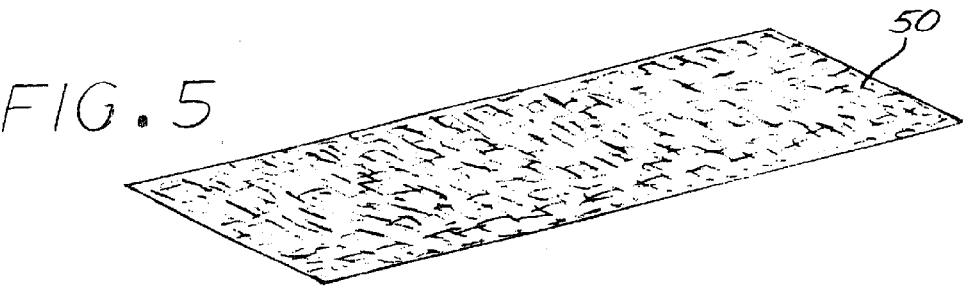
FIG. 5 is a perspective view, similar to FIG. 4, but showing the fibrous layer as it is removed from the web.

Accordingly, the covering strip of the present invention consists of a cellulose or synthetic fiber based pulp that is combined with a strengthening compound in a beater mixing process and applied to a fiber mat or other such drying device so that the material may dry and form a laminate 50, as shown in FIGS. 3–5. At the conclusion of or during the drying cycle, the layers 50 are formed in rolls 53 (FIG. 6).

The laminate 50 may then, at some point during the curing cycle, be rolled from the rolls 53 (FIG. 6) to be married together in a covering web, generally designated 57, and then passed through compression rollers 59 which apply the desired pressure to three laminations of the layer 50. The pressure on the rollers 59 may be adjusted to achieve the desired thickness, as about 0.008 inches thick. By compressing the lamination layers 50 to a greater degree, it is believed that the matting formed by the fibers 37 is likewise compressed and the fibers themselves are further compressed to minimize the bulk thereof while maintaining the strength and resistance to scuffing afforded by such fibers.

The web 57 (FIGS. 6 and 7) may then be fully cured and cut into strips, for instance 3 or 4 inches wide, and stored on rolls. Then, as the manufacturing process conditions, the cores and covering strips may be married together.

To this end, cores 26, 28, 32 or 34 may be formed from strips of metal fed off a roll and through rollers as is well known in the art. For the preferred method, the strips for the respective cores are selected of a width corresponding with the ultimate width of the trim or bead to be formed. To facilitate bonding of a hot glue, the metal strip and covering strips may be heated as it is drawn off their rolls to prevent premature cooling of the hot glue 61. As shown in FIG. 9, the hot melt glue 61 can be applied to the interface of the core and inside lamination 50 of the strip 35. The cover strip 35 may then be perforated with perforation holes spaced throughout as is common in the art. Then the respective core with the cover strip married thereto can be run through forming rollers to form the trim to the desired cross sectional configuration, as for instance the configuration for one of the beads 25, 27, 29 or 31 (FIGS. 10, 12, 16 and 17). The formed trimming strip may then be cut to the desired length, stacked and stored for subsequent shipping.

It will be appreciated that, while stored and during shipment to the construction site, the drywall trim of the present invention can be subjected to significant variations in atmospheric conditions, including temperature and humidity. Experience with trim and drywall beads of the prior art has been that, during such variations in temperature, the cover material on a core may dry out at high temperatures and shrink relative to the core causing it to pull away from the underlying core, thus creating gaps in the coverage and resulting in loss of the value of the trim. I have tested the trim made by the present invention by subjecting it to temperatures for extended periods of time at 158° to 168° and up to 200° F. Except for some minor instances where the bonding process was improperly conducted, the drywall trim has proven to withstand such high dry temperatures without experiencing any significant degree of deterioration and without separating, pulling away or bubbling up on the core. It is believed that this results from the fact that there is relatively minimal shrinkage of the cover strip as it is subjected to low humidity, thus minimizing the separation problem.

In comparing the structure of the fibers 37 and latex 41 (FIG. 18) of the present invention with that of the prior art under a microscope, I have determined that, in the cover strip 35 of the present invention, the fibers appear to be more compressed and less frayed than that in the prior art construction. Furthermore, the interstices 39 between overlapping and interwoven fibers appear to be more filled with the latex strengthening material, thus minimizing the porosity which might otherwise draw humidity.

When a workman selects a trim fabricated by the method of the present invention for installation, he or she can place that trim along the edge of a drywall panel, or in or over a corner or other joint in a drywall construction, to finish the drywall assembly in a manner known to those skilled in the art. The workman can attach, for instance, any one of the corner beads 25, 27, 29 or 31, for example, and apply joint compound thereover to the cover strip 35. The desired number of layers will be applied and, once cured, the sanding and smoothing operation may proceed.

Should a workman's finishing effort result in sanding through the joint layer and into one or more laminates 50 of the cover 35, it will be appreciated that the exterior surface thereof will be penetrated. In practice, I have discovered that such penetration will result in only minimal scuffing and that any fibers 37 severed or penetrated tend to experience relatively little fraying and roughening, thus minimizing the scuffed appearance of the end surface. This then serves to provide minimum discontinuity in surface texture and appearance between the joint material and cover strip surface. Consequently, any finish applied will tend to have a relatively uniform appearance and will exhibit only minimal discontinuity.

From the foregoing, it will be appreciated that the method and apparatus of the present invention provides an economical and convenient method of manufacturing a drywall trim which is highly durable in practice and provides for an attractive finish to the drywall project. The drywall trim is susceptible to many different applications and is highly resistant to a wide degree of atmospheric conditions without significant deterioration.

Various modifications and changes may be made with regard to the foregoing detailed description without departing from the spirit of the invention.

What is claimed is:

1. A drywall trim device for drywall construction, comprising:
    an elongated metal rigid core configured with at least one flange formed with inward and outward facing surfaces;
    a cover constructed throughout its thickness of fiber segments encapsulated with strengthening compound at the time of manufacture and curing such mixture in a strip; and
    a bond bonding said strip to said outer surface of said flange.

2. The drywall trim device as set forth in claim 1, wherein:
    said core is configured with a pair of flanges extending laterally at right angles to one another.

3. The drywall trim device as set forth in claim 1, wherein:
    said cover is fabricated with said fiber segments configured with interstices therebetween and with said strengthening compound fillng said interstices.

4. The drywall trim device as set forth in claim 1, wherein:
    the at least one flange is formed with a joint compound section offset from the plane of the outward surface of said at least one flange.

5. The drywall trim device as set forth in claim 1, wherein:
    said core is composed of galvanized steel.

6. The drywall trim device as set forth in claim 5, wherein:
    said galvanized steel is coated with zinc.

7. The drywall trim device as set forth in claim 1, wherein:
said cover includes a plurality of layers.

8. The drywall trim device as set forth in claim 1, wherein:
said cover includes three layers.

9. The drywall trim device as set forth in claim 1, wherein:
said strengthening compound is a latex.

10. The drywall trim device as set forth in claim 1, wherein:
said fiber segments are manufactured using a commericial process.

11. The drywall trim device as set forth in claim 1, wherein:
said bond is glue.

12. The drywall trim device as set forth in claim 11, wherein:
said bond is a hot melt glue.

13. The drywall trim device as set forth in claim 1, wherein:
said bond is formed by a self-adhesive surface that is integral to such strip.

14. The drywall trim device as set forth in claim 1, wherein:
said core includes two flanges and is formed with a rounded corner interposed between said flanges.

15. The drywall trim device as set forth in claim 1, wherein:
said core includes a pair of flanges formed with respective outward facing surfaces; and
said cover covers said outward facing surfaces of both said flanges.

16. The drywall trim device as set forth in claim 1, wherein:
said core is constructed of metal.

17. A method of making a drywall trim for use in drywall construction, including the following steps:
selecting a metallic core having an outer surface;
manufacturing a material layer including mixing fibers with a strengthening compound to encapsulate such fibers in said strengthening compound;
thereafter making a covering strip from such material layer; and
adhering said strip to such outer surface to provide a cover to such core.

18. The method of claim 17 that further includes:
manufacturing multiple material laminations of said fibers mixed with said strengthening compound; and
combining such laminations to form said layer.

19. A drywall trim device for dry wall construction prepared by a process, including the following steps:
selecting a metallic core having an outer surface;
manufacturing a material that is composed of cellulose fiber mixed with a strengthening compound to encapsulate such fibers in the strengthening compound;
making a covering strip from said material; and
adhering said strip to said outer surface.

20. A drywall trim device for dry wall construction prepared by a process including the following steps:
selecting an elongated angular metallic core having an outer surface;
selecting a material that is made by many cellulose fibers mixed with a strengthening compound to encapsulate such fibers in said strengthening compound;
making a covering strip from said material; and
adhering said strip to such cater surface to provide a cover to such core.

21. A drywall trim comprising:
a core having an outer surface;
a covering strip fabricated by mixing fiber segments and a strengthening compound during manufacture to encapsulate said fiber segments and to fill pores between the fiber segments to inhibit concentration therein of moisture and consequent contraction of such strip relative to said core upon exposure to a reduced humidity environment; and
a bond bonding said strip to said outer surface.

22. A drywall trim device for drywall construction, comprising:
an elongated metal core configured with at least one flange formed with an inward facing surface and an outward facing surface;
a cover fabricated from synthetic fiber segments encapsulated throughout at the time of manufacture by a strengthening compound; and
a bond bonding said strip to said outer surface of said flange.

23. The drywall trim device as set forth in claim 22, wherein:
said cover is fabricated with said fiber segments configured with interstices therebetween and with said strengthening compound filling said interstices.

24. The drywall trim device as set forth in claim 22, wherein:
said cover includes a plurality of layers.

* * * * *